July 6, 1965  E. M. ARCHER ET AL  3,192,561
APPARATUS FOR MOLDING FIREPLACE LOGS
Filed July 16, 1962  3 Sheets-Sheet 1

July 6, 1965    E. M. ARCHER ET AL    3,192,561
APPARATUS FOR MOLDING FIREPLACE LOGS
Filed July 16, 1962    3 Sheets-Sheet 2
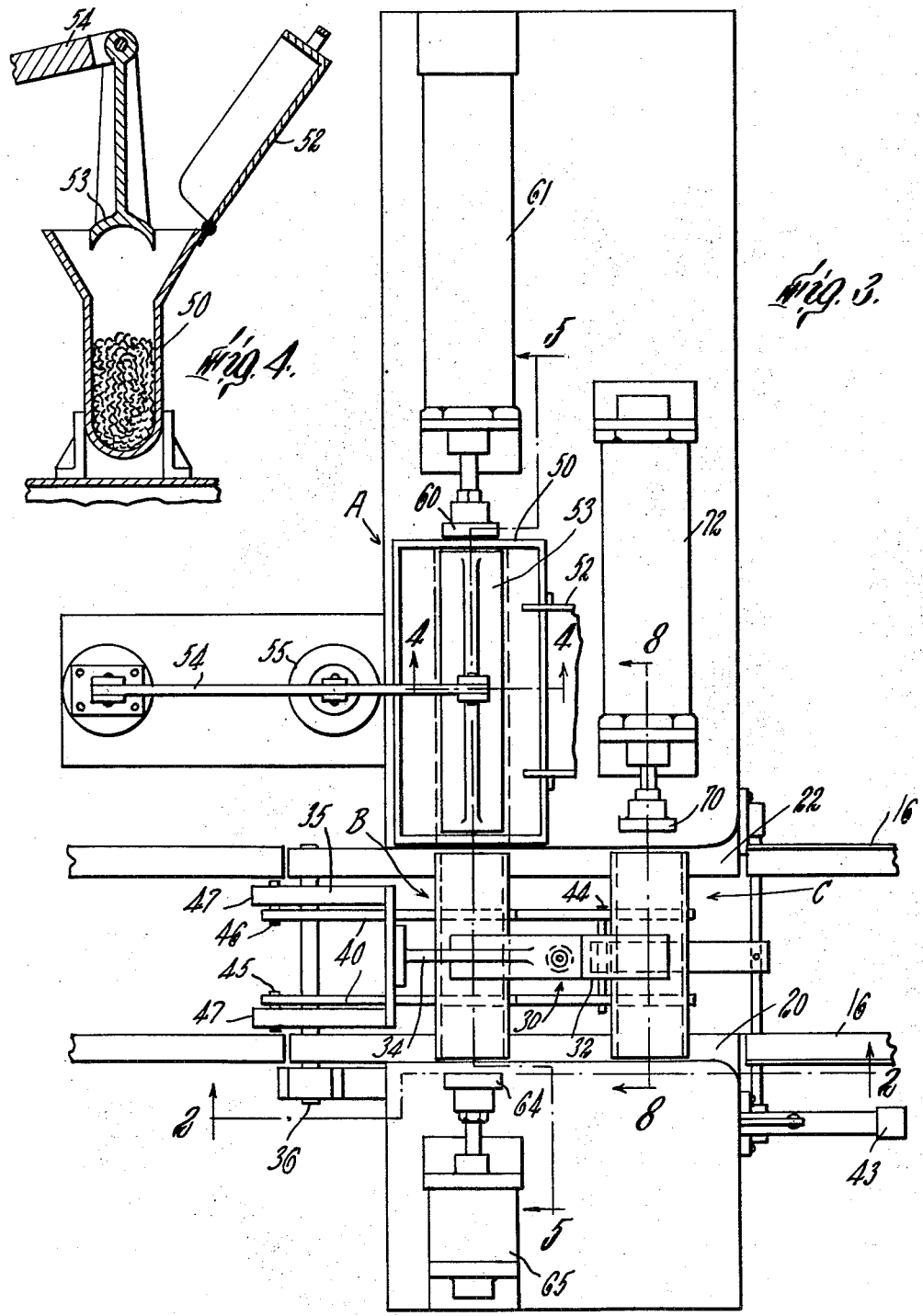

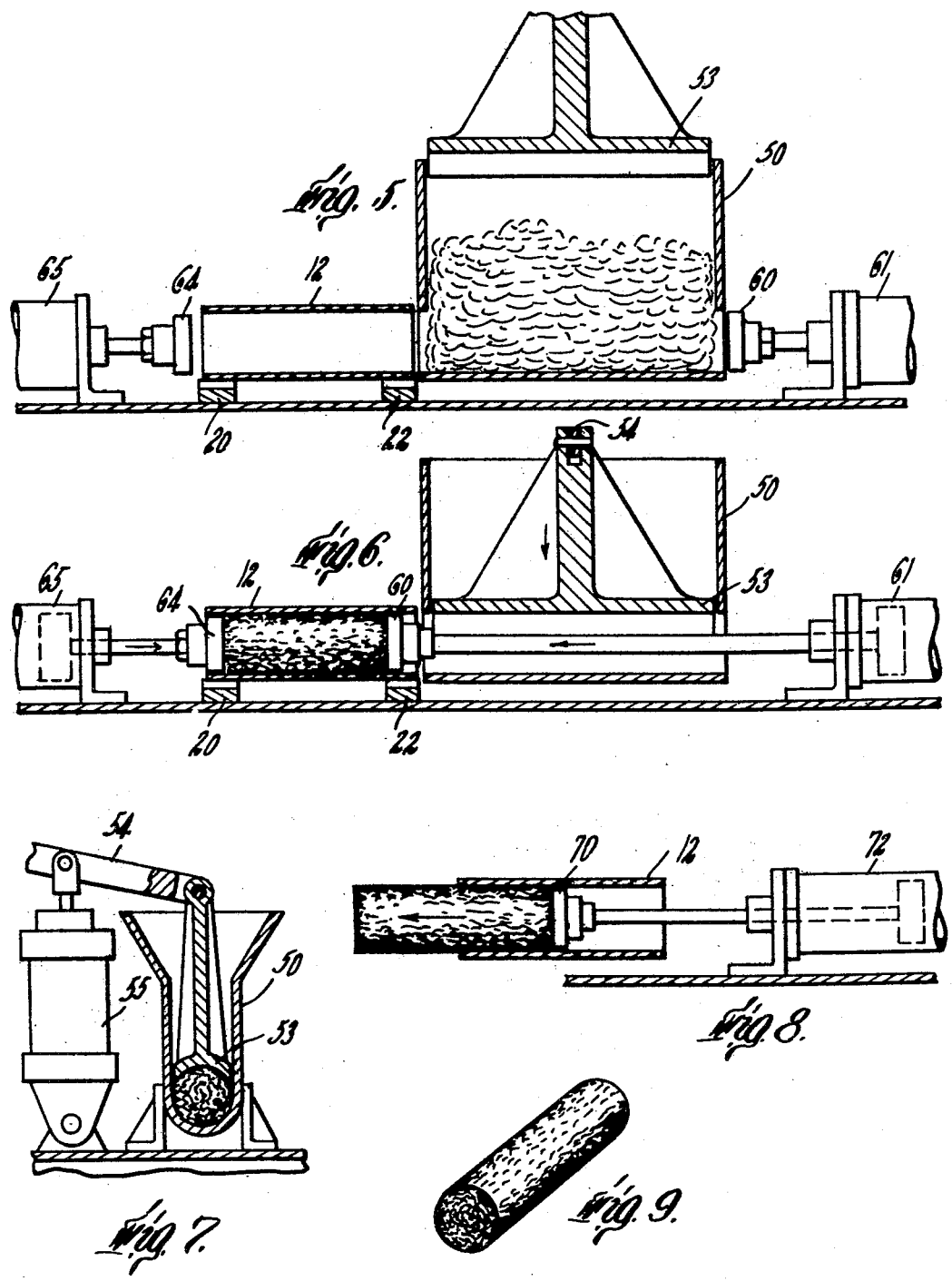

3,192,561
APPARATUS FOR MOLDING FIREPLACE LOGS
Edward M. Archer and Frederick W. Vogel, Bellows Falls, Vt., assignors, by mesne assignments, to Mountain Paper Products Corporation, Bellows Falls, Vt., a corporation of Delaware
Filed July 16, 1962, Ser. No. 210,125
3 Claims. (Cl. 18—5)

This invention relates to apparatus for molding of fireplace logs from tree bark chips and other pieces of combustible cellulose or other waste and more particularly to the manufacture from such material of properly uniformly burning logs, which are strong enough not to fracture in ordinary handling or as a result of inadvertent dropping, by a mechanized process and to apparatus for manufacturing such logs at reasonable cost.

To this end, logs of this invention comprise pieces of combustible material which are compressed both radially and axially into log size and contour, preferably cylindrical, and held in compression by a thermoplastic binder such as paraffin wax which melts as the log burns and releases the material from compression as it melts so that the log material expands in dimensions both axially and transversely of the log.

The invention may be most readily understood by referring to the accompanying drawings, wherein:

FIG. 3 is a plan view of the apparatus shown in FIG. 2;

FIG. 4 is a cross-sectional view of a detailed portion of the apparatus taken along the line 4—4 of FIG. 3;

FIG. 5 is a cross-sectional view taken along the line 5—5 of FIG. 3;

FIG. 6 is a view similar to that of FIG. 5, but with the apparatus at a different stage of its operation;

FIG. 7 is a view similar to FIG. 4, but with parts of the apparatus in a different position;

FIG. 8 is a cross-sectional view taken along the line 8—8 of FIG. 3, but with the parts in a different position; and FIG. 9 is a perspective view of a log manufactured with the use of the apparatus shown in the previous figures.

Figure 1:
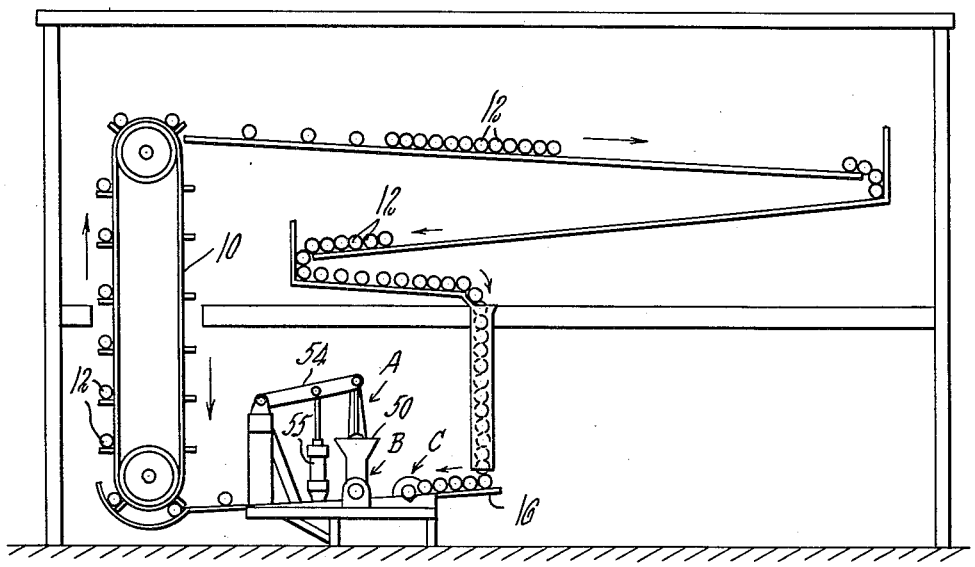
FIG. 1 is a diagrammatic side elevational view of the apparatus.

The apparatus comprises in general a closed circuit trackway for the conveyance in succession of a series of solid open-ended cylindrical molds, the trackway passing through two stations C and B. At station C the molds are successively precisely positioned for the ejection therefrom of cooled finished logs. At station B a just-emptied and readied mold is precisely positioned for insertion and axial compression therein of a new charge of material to be cooled during its advance along the closed trackway around and back to ejection station C. At a third station A beside station B the charge is radially compressed for insertion into the mold at station B.

The trackway is a multiple-traverse sloping gravity track, except for one traverse constituting a power-driven elevator 10 for securing sufficient elevation to permit gravity roll of the cylindrical molds 12 throughout the remainder of the traverses. The molds are fed into and out of stations C and B along a single inclined traverse 16. Included in this traverse 16 and extending through stations C and B are two spaced tracks 20 and 22 having one pair of opposed aligned V-shaped notches 24 (FIG. 2) at ejection station C and a second pair of opposed aligned V-shaped notches 26 at loading station B.

Hold-down mechanism indicated generally at 30 is provided to hold down two molds at a time in these notches during the operations that take place at stations B and C, together with hold-down releasing and log-lifting means to permit release of such two logs simultaneously from the restraining notches to permit further advance of the logs along traverse 16.

Figure 2:
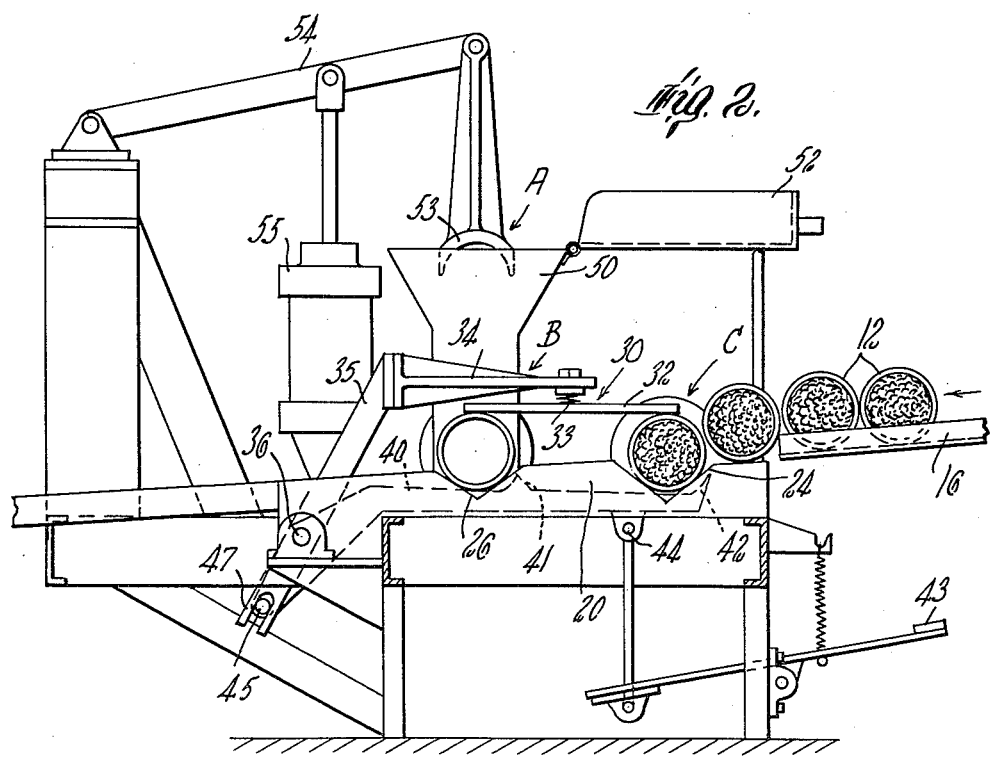
FIG. 2 is an elevational view, partly in section, of a portion of the apparatus shown in FIG. 1.

Thus as shown in FIGS. 2 and 3, a hold-down plate 32 is yieldingly suspended through spring 33 from an arm 34 connected to a U-shaped frame 35, the legs of which are pivotally mounted at 36 on the frame of the machine. The pivot pintles 36 also provide fulcrums for a pair of rocker arms 40 which extend underneath the stations B and C at a level below the bottoms of the notches 26 and 24. These rocker arms have up-standing arced projections 41 and 42, respectively, positioned just beyond the notches.

A foot treadle 43 is linked to the rocker arms 40 at 44 so that an operator may raise the rocker arms 40 to lift the molds which are resting in the notches, and the projections will simultaneously nudge the molds into advancing motion down the traverse 16. To permit such lifting, the hold-down plate 32 is simultaneously raised by the treadle operation by virtue of having the other ends of the rocker arms 40 carry pins 45 and 46, respectively, which engage bifurcated ends 47 of the U-shaped frame 35. It is understood that, when the foot treadle is released, to drop the rocker arms 40, the mold moving from station C to station B will hold the hold-down plate elevated against the resilience of spring 33 long enough to permit the next succeeding mold to fall into the notches 24 underneath the edge of the hold-down plate. Meanwhile a newly filled mold which has been at station B is simultaneously lifted out of the notches 26 and rolls by gravity down the traverse 16 out of the apparatus and into the line of succession to be carried around the closed circuit trackway.

Referring now to station A, it includes a trough 50 having for round logs a semi-cylindrical bottom and a hopper flare at the top. A pivoted loading tray 52 is convenient for pitching a measured quantity of bulk material into the trough. A complementally shaped die 53 is connected to an overhead walking beam 54 driven by a hydraulic motor 55 and movable from the position shown in FIG. 4 to the position shown in FIG. 7 to compress material which has been fed into the trough from the loading tray 52 into circular cross section.

A ram 60 mounted coaxially with the cavity in the die trough 50 and with a mold 12 which has been positioned at station B, is driven by a hydraulic motor 61 and has a path of reciprocation from the position shown in FIGS. 3 and 5 on one side of the station A through the station A to the position shown in FIG. 6, so that material radially compressed in the closed die position of FIG. 7 can be pushed by ram 60 out of the trough 50 and axially into the ready mold at station B, as shown in FIG. 6. Opposing the terminal portion of this movement is another ram 64 mounted coaxially with but in opposition to the ram 60. The ram 64 is driven by a hydraulic motor 65. Preferably the ram 64 is actuated to move it from its position as shown in FIG. 5, to its position as shown in FIG. 6 only after the termination of advance motion of ram 60, though the two motions may be timed in any desired manner. As shown in FIG. 5, the die 53 has a greater length than that of the solid mold 12.

Both of rams 60 and 64 are returned to starting positions to complete the mold-charging cycle.

Ejector station C includes a simple ram 70 mounted for movement coaxially with a filled mold presented to it at the ejector station C. The ram 70 may be driven by a hydraulic motor 72.

A typical example of manufacture of logs may be as follows:

Softwood tree bark as it comes from a pulp mill is dried to leave 5%–8% residual moisture. If desired, the bark may be subjected to the operation of an ensilage cutter if the chips are deemed to be too large. A metered amount of the dried bark for each log is weighed out and most, but not all, of it, for example ⅚ of it, is placed in a wire mesh basket which is then dipped for 1 second into a tank of melted paraffin wax at a temperature of 140° C. The material is allowed to drain for about 1 minute. After this the remainder of the measured bark is added to the basket plus ½ ounce of cupric chloride or other flame color-producing salt. The full metered load is then dumped into the tray 52, and another ½ ounce of cupric chloride is added. The tray is then tipped up to slide the materials into the hopper. The die 53 is then actuated to compress the material down into the bottom of the trough 50 and to form it into its circular cross-sectional contour. Upon termination of this motion, the ram 60 is actuated to push the bark out of the trough 50 into a mold which has been prepositioned at station B. For a log which is to have final dimensions of approximately 12 inches in length and 4 inches in diameter, the mold 12 may be 4 inches in diameter and 13½ inches long. Ram 64, moving in from the other end of the positioned mold 10, compresses the material from the opposite direction, and at the termination of their approaching mutual motions, the two rams may reach within about 11 inches of each other. As they are retracted, the bark tends to partially expand axially to about a 12-inch length.

Simultaneously during this operation hydraulic motor 72 may be actuated to eject with the ram 70 a cooled and finished log from the succeeding mold 12 which has been in position at the ejector station C. The operator then steps on the treadle to advance the mold just readied at station C into the charging station B, and the cycle is then repeated.

For this particular operation the trackway is designed to maintain the charge in the mold for a period of 2 hours in its travel from station B around to ejection station C. During hot weather it may be necessary to cool the molds by spraying them with water, but during northern winters the cooling may be accomplished in this period using ambient outside air.

The density of the log is of importance in connection with its burning characteristics, and the operation hereinbefore described is designed therefore to produce a log having a density between 0.026 and 0.030 pound per cubic inch. With lower densities the product tends to burn too fast, and with higher densities it tends not to burn by itself without kindling.

Logs so manufactured can be tossed around, dropped on the floor and will not break. This has been found to be due to the fact that the combustible material has been compressed both radially and axially from both ends, presenting intertwinings of bark pieces which minimize the presence of weaknesses in any direction despite optimum density.

It is of course understood that the operation of the various motors heretofore described can be either hand controlled or subject to coupled automatic operation by inserting suitable automatic controls, which forms no part of this invention.

What is claimed is:

1. Apparatus for assembling a measured bulk of combustible tree bark chips and binder into a compressed log of substantially uniform density, comprising a horizontally-disposed open-ended hollow split die mold having an upper section and a lower stationary section, means for raising and lowering said upper section to permit introduction of a metered quantity of material into said mold for radial compression when said mold is closed, means for positioning a solid open-ended hollow mold in coaxial alignment with said closed split mold, said solid mold being of a less length than said split mold, a first ram for transferring material compressed in said closed split mold from said split mold into said aligned solid mold, a second ram axially aligned with said first ram for movement into the other end of said solid mold, means for moving said rams into said solid mold to compress said material axially from both its ends inside of both ends of said solid mold and means for retracting both rams to permit said solid mold to be removed from said positioning means.

2. Apparatus for successively assembling measured bulks of combustible tree bark chips and binder into compressed logs of substantially uniform dimensions and density comprising, a horizontally-disposed open-ended hollow split die mold, means for opening and closing said hollow mold by retracting one of the sections of said split mold to permit introduction of a metered quantity of material into said mold for radial compression when said mold is closed, a track extending across one end of said hollow split mold, means for positioning solid open-ended hollow molds one at a time on said track in coaxial alignment with said closed split mold, a first ram for transferring material compressed in said closed split mold from said split mold into said aligned solid mold, a second ram adapted to enter the other end of said solid mold, means for moving said second ram into said solid mold to compress material, transferred into said solid mold by said first ram, from said other end of said solid mold, and means for ejecting a log compressed in a solid mold from said solid mold in the course of its advance along said track to said aligned position.

3. Apparatus as claimed in claim 2, wherein said positioning means includes notches in said track and hold-down means for holding a solid mold in said notches while said rams operate.

References Cited by the Examiner
UNITED STATES PATENTS

| | | | |
|---|---|---|---|
| 1,409,224 | 3/22 | McManus | 18—5 |
| 1,627,601 | 5/27 | Goebel | 18—5 |
| 1,870,522 | 8/32 | Maurel | 44—24 |
| 2,976,133 | 3/61 | Stueler | 44—24 |

FOREIGN PATENTS

| | | |
|---|---|---|
| 223,302 | 10/24 | Great Britain. |

J. SPENCER OVERHOLSER, *Primary Examiner.*

DANIEL E. WYMAN, *Examiner.*